July 27, 1948.  M. G. CROSBY  2,446,077

FREQUENCY-SHIFT TELEGRAPH SYSTEM

Filed May 2, 1945  3 Sheets-Sheet 1

INVENTOR.
MURRAY G. CROSBY

BY John J. Rogan

ATTORNEY

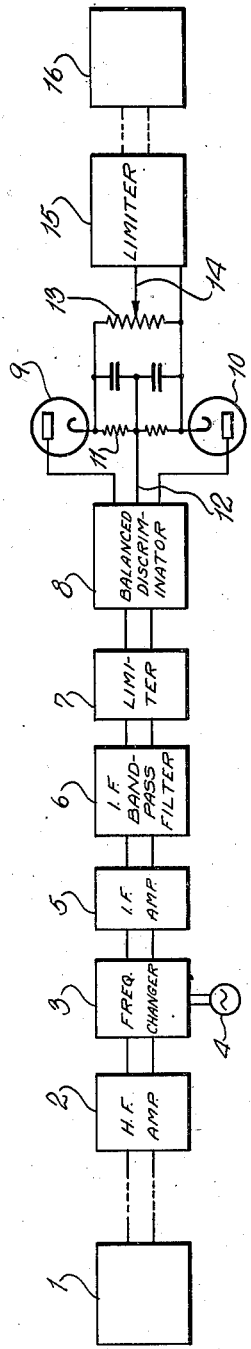
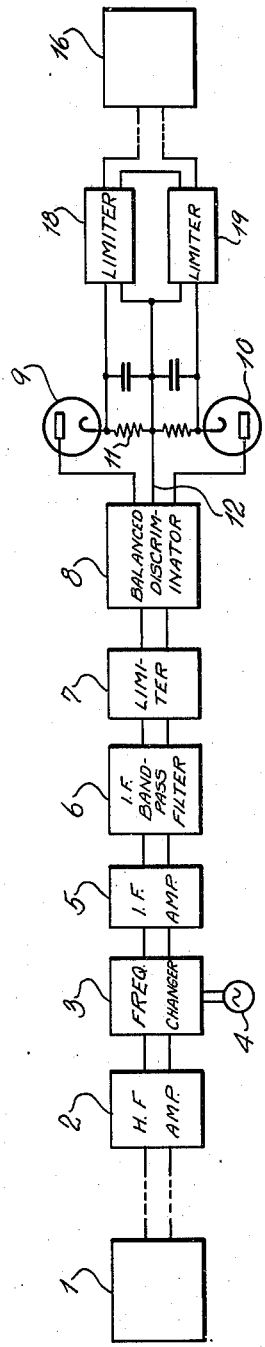

July 27, 1948. M. G. CROSBY 2,446,077
FREQUENCY-SHIFT TELEGRAPH SYSTEM
Filed May 2, 1945 3 Sheets-Sheet 3
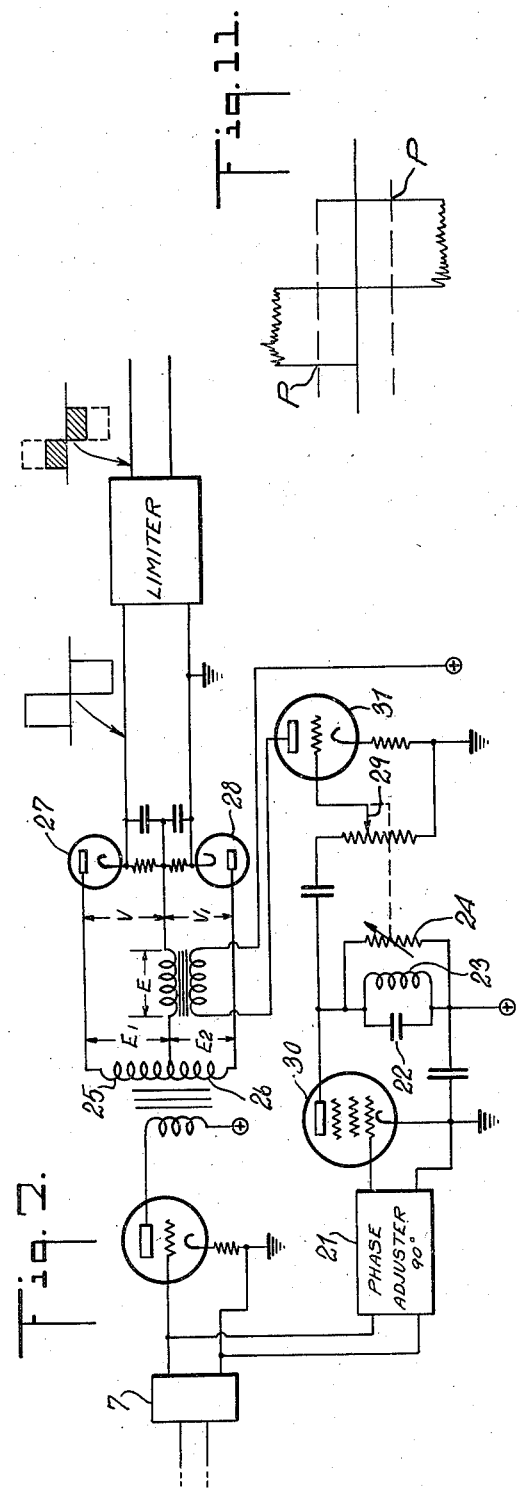
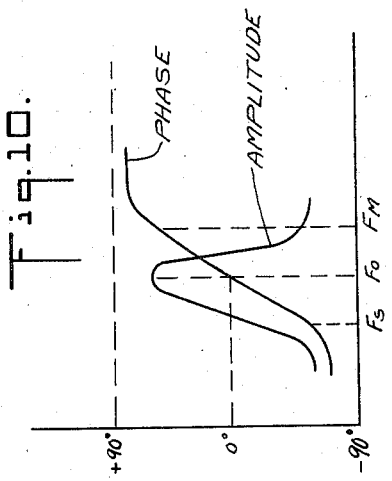
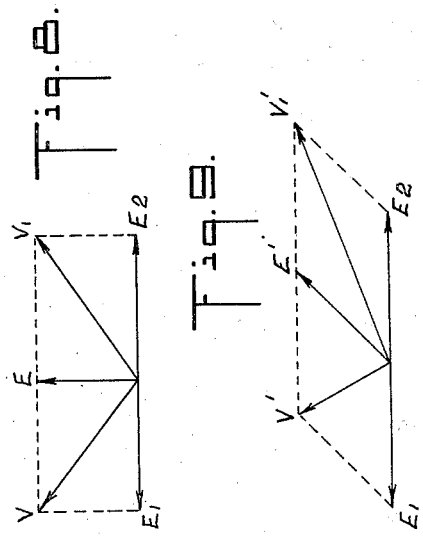
INVENTOR.
MURRAY G. CROSBY
BY John J. Rogan
ATTORNEY Patented July 27, 1948

2,446,077

UNITED STATES PATENT OFFICE 2,446,077

FREQUENCY-SHIFT TELEGRAPH SYSTEM

Murray G. Crosby, Riverhead, N. Y., assignor to Press Wireless, Inc., New York, N. Y., a corporation of Delaware Application May 2, 1945, Serial No. 591,483

2 Claims. (Cl. 178—66)

This invention relates to telegraph systems and more especially to those systems which employ separate characterizing frequencies for different signal conditions.

A principal object of the invention relates to an improved telegraph system employing carrier-frequency-shift transmission.

It has been known for some time that telegraph signals can be transmitted by using two separate frequencies at the transmitter, one frequency representing the mark condition and the other frequency representing the space condition. In such systems, it is necessary at the receiver to convert the two frequencies into corresponding D. C. signals usually of opposite polarity or at least of opposite magnitudes with respect to a fixed base potential. In achieving this conversion, it is highly desirable that the resultant D. C. signals be of a uniformly flat-topped wave shape and with the envelopes of the positive and negative waves symmetrical in amplitude with respect to the zero or other fixed base potential. One known system of this type achieves the conversion by segregating the two frequencies into separate channels, one channel being provided with a band-pass filter for passing the mark frequency with certain desired side bands, and the other channel having a similar band-pass filter for passing the space frequency with its side bands. In order to achieve the proper results with the prior system, it is necessary that the two separate band-pass filters be matched within rather close limits, so that the effect of changing zero bias may be obviated. Apart from the cost and complexity of such band-pass filters, is the fact that they must be "tailor made" to suit each range of mark and space frequencies that are used for transmission. Likewise, such filters, since they usually require recurrent network sections, are bulky and offer a decided disadvantage to mobile signalling equipment. Furthermore, with the two-filter method of signal channelizing, and because of the limitations of band-pass filter design, it is not easy to change the band width to meet different signalling conditions.

Accordingly, it is a principal object of this invention to provide an arrangement for converting received mark and space characterizing frequencies into correspondingly D. C. signals, which arrangement overcomes all the above-noted and other disadvantages of the known band-pass filter arrangement.

Another object is to provide an improved method and apparatus for converting carrier-frequency-shift telegraph signals into corresponding D. C. signals by employing a single balanced discriminator.

A feature of the invention relates to an improved converter arrangement for converting received mark and space characterizing frequencies into symmetrical D. C. waves suitable for application to a polarized telegraph signal responder or the like.

Another feature relates to an improved converter for converting received mark and space characterizing frequencies into corresponding square-topped waves and having means whereby the amplitude and the normal signal bias of the D. C. mark and space signals may be readily controlled without affecting the band-width adjustments of the remaining components of the converter.

Another feature relates to an improved frequency-discriminator according to the invention.

A still further feature relates to the novel organization, arrangement and interconnection of parts which cooperate to produce a more efficient, simpler and highly flexible telegraph system of the carrier-frequency-shift type.

Other features and advantages not specifically enumerated will become apparent after a consideration of the following detailed descriptions and the appended claims.

In the drawing,

Fig. 4 is a block diagram showing a system embodying features of the invention.

Fig. 5 is another block diagram of an alternative form of Fig. 4.

Fig. 7 is a diagram of a preferred form of discriminator for use in the systems of Figs. 4, 5 and 6.

Figs. 8, 9, 10 and 11 are graph diagrams, explanatory of Fig. 7.

Figure 1:
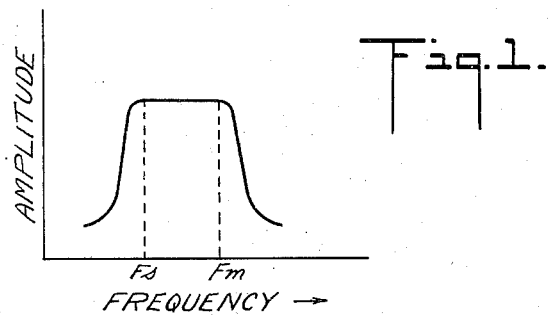
Fig. 1 is a graph showing the characteristic of the limiter which feeds the discriminator according to the invention.

Referring to Fig. 4, there is shown in generalized schematic block diagram form a typical telegraph system embodying features of the invention. Inasmuch as the portions of such a system represented by the blocks are well-known in the art, detailed description thereof is not required herein. The block 1 represents a source of signals, preferably a source which produces separate frequencies or separate frequency limits, each representing a different signal condition. For example, the source may be a device for generating a sustained carrier wave of frequency F whose carrier frequency is shifted $F+a$ to represent marking ($F_m$), and is shifted to $F-a$ to represent spacing ($F_s$). The value "$a$" may be any given amount determined by the channel width available or by other traffic conditions. Merely as an example "$a$" may be 450 C. P. S. and "F" may be 15,000 kc. Instead of shifting the frequency of the main carrier "F" between the limits $F+a$ and $F-a$, the original mark and space signals may shift the frequency of a subcarrier which in turn may be transmitted by amplitude or frequency or phase modulation of the main carrier F. For a detailed description of a typical arrangement for shifting the carrier or sub-carrier frequency, reference may be had to application Serial No. 498,278, filed August 12, 1943, now Patent Number 2,387,098.

At the receiving station, the shifted frequency carrier is amplified in any suitable high frequency amplifier 2, whose output is applied to any well-known frequency changer 3, for example one that is fed from a local oscillator 4 so as to change the high frequency-modulated carrier into a correspondingly modulated intermediate frequency carrier. After amplification in the intermediate frequency amplifier 5, the signal is applied to a band-pass filter 6 which passes the intermediate frequency carrier with its mark and space frequency modulations. In the above assumed conditions, the filter 6 may for example have a band-pass of 464.5 to 465.5 kc.

Figure 2:
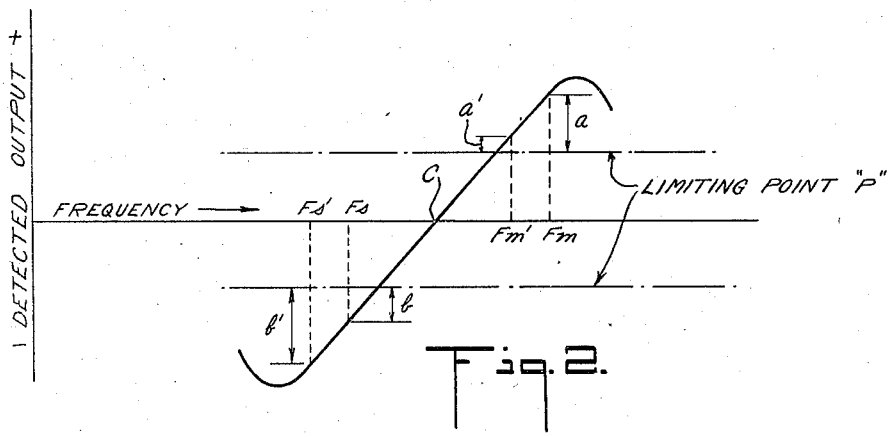
Fig. 2 is a graph of the characteristic of the balanced discriminator.
Figures 3, 3A:
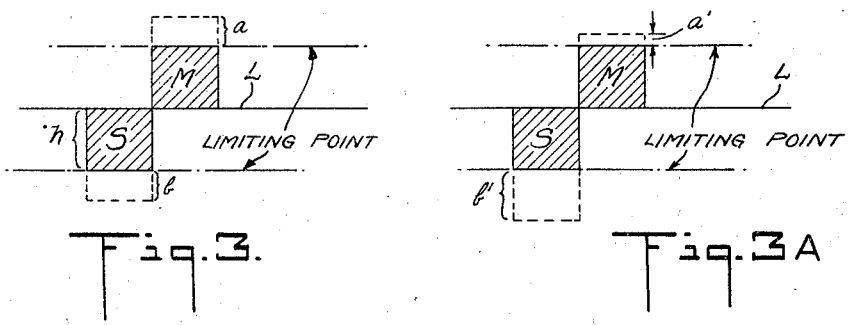
Fig. 3 is a wave diagram showing successive equal mark and space signals derived according to the invention.
Fig. 3A is a wave diagram showing successive mark and space signals of equal bias derived according to the invention from unequally-biased signals.

The passed band of intermediate frequency signals is then applied to amplitude-limiting device or network 7 of any well-known design whereby the signals in the output thereof are made of substantially uniform amplitude as represented by the graph of Fig. 1. By this means, undesired amplitude variations are removed. These uniform amplitude signals are then impressed upon a balanced discriminator network 8 of any well-known design whose characteristic is represented in Fig. 2. For a detailed description of a suitable discriminator, reference may be had to abandoned application Serial No. 457,709, filed September 9, 1942. Preferably however a discriminator such as shown in Fig. 7 is used. The discriminator 8 is so adjusted that the cross-over point is located substantially equidistant from the frequencies $F_m$ and $F_s$. The output of discriminator 8 is then applied in divided balanced relation to a pair of diode rectifier detectors 9, 10, whose cathodes are connected together through the resistor 11, the midpoint of which is connected to the common return lead 12. A potentiometer 13 is connected across both cathodes and is provided with an adjustable contact 14. This potentiometer controls the amount of detected output voltage fed to limiter 15, and thereby acts as a control on the degree of limiting. The degree of limiting determines the limiting point P (Figs. 2, 3 and 3A). The D. C. signal voltages developed across resistor 13 are then applied to an amplitude limiter 15. The output of limiter 15 therefore consists of a D. C. signal, the positive waves of which are of uniform amplitude and square-topped shape, as are also the negative waves. This is illustrated in Fig. 3 which represents two succeeding mark and space signals of equal bias with respect to the base or datum line L. This same amplitude uniformity and square-topped wave relation is maintained even though the successive signal excursions are of unequal amplitude as illustrated in Fig. 3A. The D. C. signals can then be applied to any well-known form of telegraph responder or keyer 16.

Figure 6:
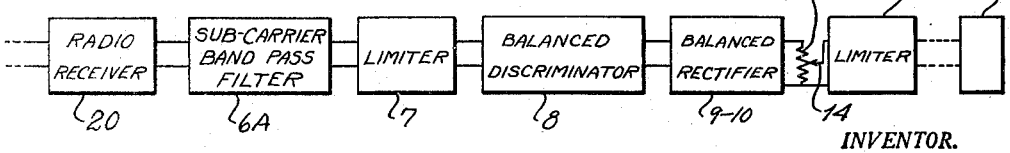
Fig. 6 is a block diagram of a modification of Figs. 4 and 5.

Referring to Fig. 5, there is shown an alternative form of Fig. 4 and wherein the same numerals represent similar apparatus to that shown in Fig. 4. In Fig. 5 the diode rectifiers 9, 10, instead of being connected to a single limiter are connected to respective amplitude limiters 18 and 19, the outputs of which are connected in series and applied to the telegraph responding device 16. When the mark and space signals are transmitted by a subcarrier modulation method wherein the subcarrier is shifted in frequency for mark and space, a receiving arrangement as shown in Fig. 6 may be used. Referring to Fig. 6, the unit 29 may be a conventional receiver of the amplitude modulation, phase modulation or frequency modulation type, depending upon the particular kind of transmission that is effected from the transmitter. The receiver furnishes, in the well-known manner, an output of the subcarrier which bears the frequency-shift modulations corresponding respectively to mark and space. The subcarrier is usually at a frequency of a few thousand C. P. S. For example, if at the transmitter, the subcarrier were shifted between 2100 and 3000 C. P. S., then a band-pass filter 6A would be used for passing the band from approximately 2000 to 3100 C. P. S. The remaining units 7 to 16 shown in Fig. 6, may be the same as the corresponding units of Fig. 4, or they may correspond to the similar units of Fig. 5.

One of the most disturbing conditions met within such frequency shift systems is what is known as frequency drift. The effect of this drift is to destroy the symmetrical wave shape of the detected output of the frequency-modulation discriminator. For the in-tune condition, in the absence of drift, the wave shape at the output of the discriminator is symmetrical as shown in Fig. 3. In the presence of drift, or an off-tune condition, the wave shape is unsymmetrical as shown in Fig. 3A. By the use of limiter 15 at the output of the discriminator, the extreme positive and negative excursions of the wave are clipped off at points P which are equidistant from the zero axis. As a result, the wave shape is made symmetrical for a considerable range of drift. As can be seen from the diagrams, this range of drift is such that the wave will remain symmetrical as long as the two halves of the wave reach the limiting points P of the limiter. Maintenance of symmetry of this discriminator output wave form has the advantage that frequency drift does not upset the tone keyer or other signal utilizing devices which are operated by the detected output.

In Fig. 2 the "mark" and "space" frequencies for the in-tune condition are indicated by $F_s$ and $F_m$. The off-tune conditions are $F_{s'}$ and $F_{m'}$.

Fig. 7 shows an embodiment of a preferred form of discriminator to be used with this system. This discriminator has the advantage that the band width may be varied in a simple manner. The discriminating action is obtained by a co-action between two branches of the signal. One of these branches contains a phase adjustor 21, and a tuned circuit including condenser 22, 23. The phase adjustor sets the phase at approximately 90° for the in-tune condition. The tuned circuit provides a phase change with frequency which brings about an amplitude change when this branch of the wave is combined with the original wave as indicated in Fig. 10 and as explained in Radio Engineering Handbook, by Terman, page 143. The two branches of the wave are combined by means of transformers 25 and 26, feeding diodes 27 and 28, which correspond to diodes 9 and 10 (Figs. 4 and 5). The vector diagrams of Figs. 8 and 9 shows how the two branches of the wave combine. Fig. 8 is for the in-tune condition in which the resultants fed to the two diodes are of equal magnitude. For this condition the incoming signal is tuned to the peak of the resonance curve of tuned circuit 22—23, so that there is no phase shift due to the tuned circuit. The phase adjustor imparts a 90° phase shift so that E is 90° out of phase with either $E_1$ or $E_2$. The result is a balanced condition of resultant vectors V and $V_1$ which result in zero D.-C. output from the differential detectors 27 and 28. Fig. 10 shows the phase and amplitude characteristics of tuned circuit 22—23. The selectivity of the tuned circuit is adjusted by means of variable resistor 24, which is ganged with amplitude-controlling potentiometer 29. Resistor 24 acts as a variable damping which controls the sharpness of tuning of 23—24. It also controls the steepness of the phase characteristic which determines the discriminator band width. When the damping is varied by resistor 24, the amplification of tube 30 is also varied. In order to maintain constant amplitude of voltage E, resistor 24 is ganged with potentiometer 29 to provide a compensating variation. Thus, when resistor 24 is lowered to broaden the discriminator band width, the gain of tube 30 is also lowered so that by the ganging mechanism the slider on potentiometer 29 should be raised to provide a compensating increase in overall gain through tubes 30 and 31.

Fig. 11 shows the wave at the output of the discriminator in the presence of noise. In such a frequency-shift modulation system, noise appears as a modulation on the positive and negative halves of the discriminator output wave. Both the frequency-modulation component and the amplitude-modulation component of the noise appear as this type of modulation on the output wave. In the system of this invention, the limiter provided at the output of the discriminator limits the amplitude at the points P so that the output wave form has the shape shown in connection with the output of Fig. 7. Thus, the modulation produced by the noise is removed. Since the amplitude-modulation component is removed by this type of limiting, the usual limiter preceding the discriminator and detector can be dispensed with. This is a further advantage of this invention.

While particular embodiments have been illustrated, it will be understood that various changes and modifications may be made therein without departing from the spirit and scope of the invention.

What I claim is:

1. The method of telegraph transmission which comprises, generating a sustained carrier of frequency F, shifting the normal frequency to $F+a$ for one telegraph signal and to $F-a$ for another telegraph signal, receiving said shifted carrier frequencies to derive two frequencies of difference $2a$, limiting the amplitude of said derived frequencies so as to remove undesired amplitude variations, converting the amplitude-limited frequencies into D. C. signals of opposite sign with respect to a base potential by subjecting said amplitude-limited frequencies to a frequency-to-amplitude discrimination and detection whereby one frequency produces a positive sign D. C. signal and the other frequency produces a negative sign D. C. signal, amplitude-limiting said negative and positive D. C. signals to produce final signals of uniform amplitude and square-topped wave shape, and applying said final signals to a telegraph responder.

2. The method of telegraph transmission which comprises generating a sustained carrier of frequency F, shifting the said frequency to $F+a$ for one telegraph signal, and to $F-a$ for another telegraph signal, receiving said shifted carrier frequencies to derive two frequencies of frequency difference $2a$, converting the derived frequencies into D. C. signals of opposite sign with respect to a base potential by subjecting the derived frequencies to a frequency-to-amplitude discrimination and detection whereby one frequency produces a positive sign D. C. signal and the other frequency produces a negative sign D. C. signal, subjecting the derived signals to amplitude limitation only after said conversion to produce final signals of uniform amplitude and substantially square-topped wave shape, and applying said final signals to a telegraph responder.

MURRAY G. CROSBY.

REFERENCES CITED

The following references are of record in the file of this patent:

UNITED STATES PATENTS

| Number | Name | Date |
|---|---|---|
| 2,211,750 | Hunley | Aug. 20, 1940 |
| 2,282,910 | Thompson | May 12, 1942 |
| 2,282,961 | Harris | May 12, 1942 |
| 2,291,369 | Boughtwood | July 28, 1942 |
| 2,298,409 | Peterson | Oct. 13, 1942 |
| 2,349,881 | Peterson | May 30, 1944 |
| 2,379,614 | Tunick | July 3, 1945 |